(12) United States Patent
Manickam et al.

(10) Patent No.: US 10,796,181 B2
(45) Date of Patent: Oct. 6, 2020

(54) MACHINE LEARNING BASED METHOD AND SYSTEM FOR ANALYZING IMAGE ARTIFACTS AND IMAGING SYSTEM FAILURE

(71) Applicant: GE Precision Healthcare LLC, Wauwatosa, NY (US)

(72) Inventors: Kavitha Manickam, Karnataka (IN); Ramesh Venkatesan, Karnataka (IN); Rakesh Shevde, Karnataka (IN); Rajagopalan Sundaresan, Tamil Nadu (IN); Prakruthi Jakathe, Karnataka (IN); Vignesh Singh, Karnataka (IN); Krishnan Varadarajan, Karnataka (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 13 days.

(21) Appl. No.: 16/134,219

(22) Filed: Sep. 18, 2018

(65) Prior Publication Data

US 2020/0089983 A1    Mar. 19, 2020

(51) Int. Cl.
| | |
|---|---|
| *G06K 9/00* | (2006.01) |
| *G06K 9/03* | (2006.01) |
| *G06N 3/08* | (2006.01) |
| *G06N 5/04* | (2006.01) |
| *G06T 7/00* | (2017.01) |

(52) U.S. Cl.
CPC ........... *G06K 9/03* (2013.01); *G06K 9/00536* (2013.01); *G06N 3/08* (2013.01); *G06N 5/046* (2013.01); *G06T 7/0012* (2013.01)

(58) Field of Classification Search
CPC .... G06K 9/03; G06K 9/00536; G06K 9/6259; G06K 9/6267; G06K 9/66; G06K 9/4628; G06K 9/036; G06K 9/6265; G06K 9/6256; G06K 9/0063; G06K 9/2054; G06K 9/6257; G06K 9/6269; G06K 9/6262; G06K 2209/05; G06N 3/08; G06N 3/0454; G06N 3/0472; G06N 3/0445; G06N 3/082; G06N 3/088; G06N 5/046; G06N 5/022; G06N 5/003; G06N 20/00; G06N 20/20; G06T 7/0012; G06T 7/0002; G06T 7/0014; G06T 7/143; G06T 7/248; G06T 3/4046; G06T 2207/20081; G06T 2207/20084; G06T 2207/30168; G06T 2207/30004;

(Continued)

(56) References Cited

U.S. PATENT DOCUMENTS

| | | | | |
|---|---|---|---|---|
| 6,609,217 B1 * | 8/2003 | Bonissone | .......... | G06F 11/2257 714/26 |
| 6,615,367 B1 * | 9/2003 | Unkle | ................ | G05B 23/0229 706/46 |

(Continued)

*Primary Examiner* — Jose L Couso
(74) *Attorney, Agent, or Firm* — Armstrong Teasdale LLP

(57) ABSTRACT

Methods and systems for addressing malfunction of a medical imaging device are disclosed. The method includes classifying a type of an image artifact in a medical image acquired by the medical imaging device by using a trained machine learning model. The method also includes analyzing system data associated with acquisition of the medical image to identify one or more system parameters that might have contributed to the type of image artifact and providing an action for addressing the image artifact based on the identified one or more system parameters.

20 Claims, 8 Drawing Sheets

(58) Field of Classification Search
CPC .......... G06T 2207/20076; G16H 30/40; G16H 30/20; G16H 40/40; G16H 40/20; G16H 40/63; G16H 50/20; A61B 6/586; A61B 6/5217; A61B 6/5211; A61B 6/5258; A61B 6/545; A61B 6/54; A61B 5/7267; A61B 5/7282; A61B 2560/0271; G05B 23/0229; G05B 23/0294; G05B 23/0283; G06F 11/079; G06F 11/2205; G06F 11/2257; G06F 11/0748; G06F 11/0769; G06F 11/30; G06F 11/321; G06F 11/3409; G06F 11/0751; G06F 11/0793; G06F 11/2263; G06F 11/3452; G06F 11/3495; G06F 19/321; G06F 19/3418; G06F 19/324; G06F 19/00; G06F 30/20; G06Q 10/06; Y04S 10/54; G01R 33/543; G01R 33/5608; H04L 41/5003; H04L 41/5038; H04L 41/5051; H04L 41/5074

See application file for complete search history.

(56) References Cited

U.S. PATENT DOCUMENTS

| | | | | |
|---|---|---|---|---|
| 6,882,271 | B2* | 4/2005 | Hendrickson | G06F 11/2247 340/286.07 |
| 2005/0114180 | A1* | 5/2005 | Ploetz | G06Q 50/22 705/2 |
| 2005/0157848 | A1* | 7/2005 | Miyauchi | A61B 6/56 378/207 |
| 2011/0302461 | A1* | 12/2011 | Goertler | G16H 40/40 714/57 |
| 2012/0010495 | A1* | 1/2012 | de Oliveira | A61B 5/055 600/410 |
| 2017/0302540 | A1* | 10/2017 | Monahan | H04L 41/5074 |
| 2018/0333132 | A1* | 11/2018 | Noda | A61B 6/586 |
| 2019/0130571 | A1* | 5/2019 | Allmendinger | G06T 11/008 |
| 2019/0155709 | A1* | 5/2019 | de Oliveira | G06F 11/3409 |
| 2019/0197358 | A1* | 6/2019 | Madani | G06K 9/6267 |
| 2019/0228547 | A1* | 7/2019 | Chandarana | G06N 3/0481 |

\* cited by examiner

_US 10,796,181 B2_

MACHINE LEARNING BASED METHOD AND SYSTEM FOR ANALYZING IMAGE ARTIFACTS AND IMAGING SYSTEM FAILURE

TECHNICAL FIELD

Embodiments of the present specification relate to generally a method and system for analyzing malfunction of a medical imaging system, and more specifically to analyzing malfunction of the medical imaging system using a machine learning model.

BACKGROUND OF THE INVENTION

Typically, when a medical imaging device malfunctions, it can cause problems with a user. It is essential that a malfunctioning machine be repaired quickly and adequately. Usually, a field engineer is called in to diagnose and repair the medical imaging device. The malfunction may be for example, presence of some image artifacts in an image generated by the medical imaging device. The image artifacts may be due to hardware and/or software problems. In general, artifacts can occur in images when the data acquired from the patient or object are inconsistent with the imaging model, as implicitly or explicitly assumed by the algorithm that generates the reconstructed images from the acquired data. In medical imaging, patient implants such as dental fillings, surgical clips and prostheses are a common cause of artifacts. Also, involuntary patient body motion, cardiac and respiratory motion may also cause artifacts. On the system side, radio-frequency (RF) interference and incorrect gain adjustment from a pre-scan may cause artifacts. For CT and single-photon emission computed tomography (SPECT), mechanical system misalignment and failure of detector pixels may cause artifacts. Besides, the discrete nature of data acquisition approximates the continuous physics models from which the reconstruction algorithms are often based. This may lead to streak artifacts in industrial CT of parts with long straight edges.

While examining the device, typically the field engineer will look at a log generated from the device, which contains sequences of events that occurred during routine operation as well as during any malfunction situation. The log represents a "signature" of the operation of the device and can be used to correlate malfunctions. Using the experiences and expertise, the field engineer looks through the log and tries to identify any symptoms that may point to the fault. Then the field engineer tries to fix the problem that may be causing the device malfunction. However, there are situations where the field engineer may not be able to find a solution to the fault and the fault needs to be referred to the central engineering team. The central engineering team may get additional details such as, system and log files of various subsystems of the medical imaging device. This involves a lot of repetitive and manual tasks with the field engineer visiting customer sites to inspect the device and reproduce issues and log files and images that would help the central engineering team to investigate the fault. Using these log files and images, the central engineering team does thorough analysis of each subsystem which typically makes the process time consuming and down time of the device increases.

BRIEF DESCRIPTION

One embodiment of the present disclosure relates to a method for addressing malfunction of a medical imaging device. The method includes classifying a type of an image artifact in a medical image acquired by the medical imaging device by using a trained machine learning model. The method also includes analyzing system data associated with acquisition of the medical image to identify one or more system parameters that might have contributed to the type of image artifact and providing an action for addressing the image artifact based on the identified one or more system parameters.

Another embodiment relates to a system for addressing malfunction of a medical imaging device. The system comprises a memory storing a trained machine learning model and a processor coupled to the memory. The processor is configured to classify a type of an image artifact in a medical image acquired by the medical imaging device by using the trained machine learning model. The processor is further configured to analyze system data associated with acquisition of the medical image to identify one or more system parameters that might have contributed to the type of image artifact and provide an action for addressing the image artifact based on the identified one or more system parameters.

A more complete understanding of the present disclosure, as well as further features and advantages thereof, will be obtained by reference to the following detailed description and drawings.

DETAILED DESCRIPTION

Figure 1:
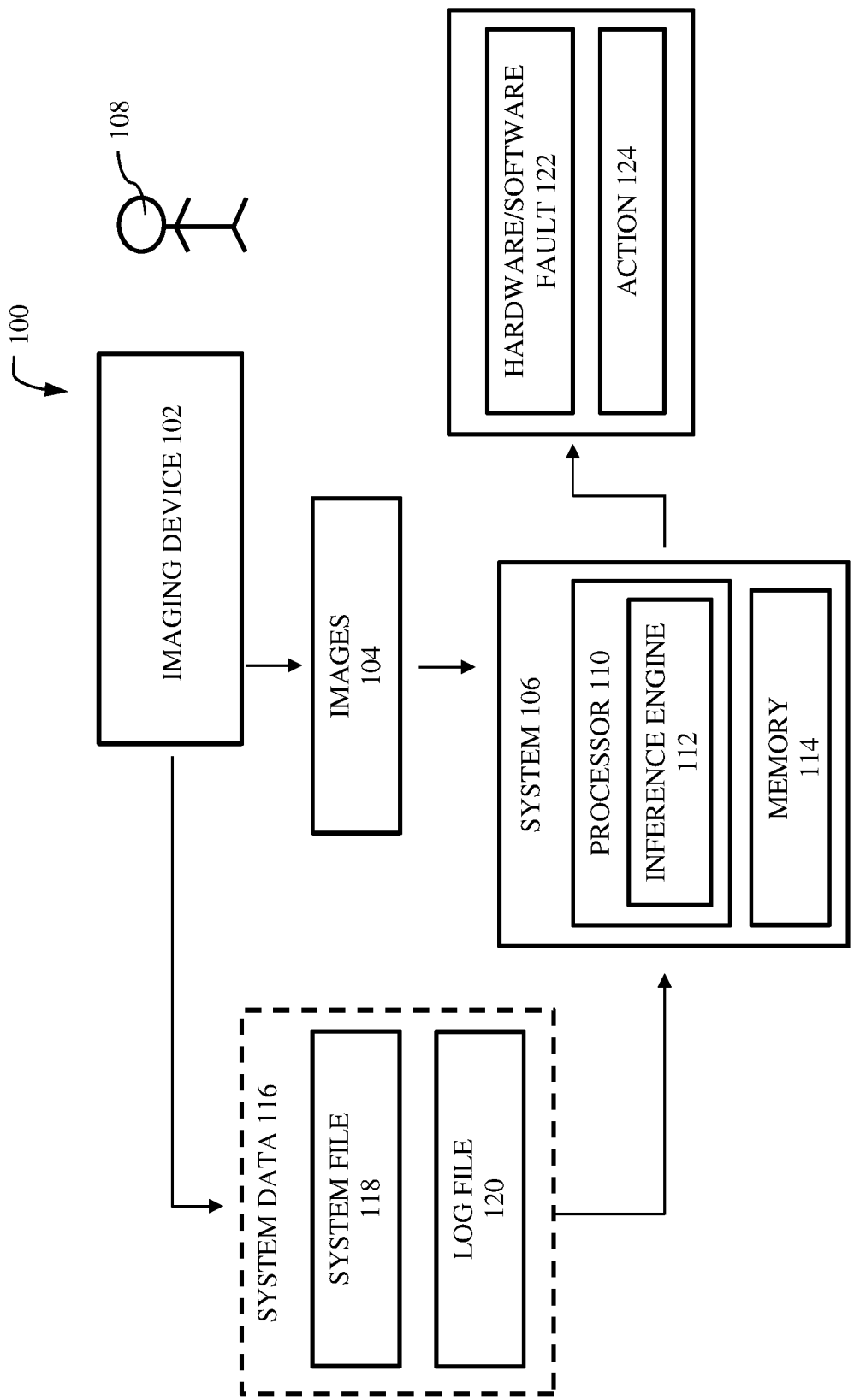
FIG. 1 is a block diagram of the environment for analyzing system malfunction in a medical imaging system in accordance with an exemplary embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

One or more specific embodiments of the present disclosure are described below in order to provide a thorough understanding. These described embodiments are only examples of method and system for managing image artifact in a medical image. Moreover, as will be understood, embodiments of the invention are not limited to neural networks and, accordingly, may include other forms of artificial intelligence and machine learning techniques. The skilled artisan will understand that specific details described in the embodiments can be modified when being placed into practice without deviating from the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

In addition, it should be understood that references to "one embodiment" or "an embodiment" of the present disclosure are not intended to be interpreted as excluding the existence of additional embodiments that also incorporate the recited features. Further, the limitations of the following claims are not written in means-plus-function format and are not intended to be interpreted as such, unless and until such claim limitations expressly use the phrase "means for" followed by a statement of function void of further structure.

As discussed in detail below are embodiments of a method for analyzing malfunction of a medical imaging device. The method includes classifying a type of an image artifact in a medical image generated by the medical imaging device using a trained machine learning model. The method also includes reviewing system data to analyze one or more system parameters associated with the image artifact, wherein the system data is associated with the medical imaging device. The method further includes providing an action selectively for addressing the image artifact based on the analysis of the one or more system parameters.

FIG. 1 illustrates schematically an environment 100 for analyzing malfunction of a medical imaging device 102 in accordance with an exemplary embodiment. The environment 100 includes a medical imaging system, sometimes referred to as an imaging device 102 or scanner. As will be appreciated by those skilled in the art, the imaging device 102 may include any suitable modality system, such as ultrasound systems, MRI (Magnetic Resonance Imaging) systems, CT (Computed Tomography) systems, X-ray systems, PET (Positron Emission Tomography) systems, and so forth. The imaging device 102 is generally capable of creating image data of a subject of interest based upon the physics of the particular modality. The imaging device 102 operates under the control of a control circuitry (not present in the present figure) which generally initiates imaging scanning sequences, implements particular scanning protocols, and regulates the acquisition of image data for reconstruction of images such as, images 104 (i.e. medical images of patient anatomy). A data acquisition circuitry (not present in the present figure) may receive such data and store the data for further processing, enhancement, and reconstruction into the ultimate images.

The images 104 generated may include artifacts due to various factors. These artifacts may cause image rejection, since artifacts prevent or hinder the analysis of the image content. An artifact as used herein may include any feature present in the image that does not correspond to the actual anatomy of patient or object being imaged. Exemplary artifacts include parts of the patient reappearing at other image locations and overlapping the actual image in magnetic resonance imaging (MRI) (i.e., ghosting artifacts) and streaks emanating from dense metallic objects in computed tomography (CT) images (metal artifacts), and so on. The cause of image artifacts needs to be identified and resolved.

The images 104 are received by a system 106 for analyzing image artifacts. The system 106 represents a tool that may be invoked by a user 108 (e.g., a clinician) from the imaging device 102. The user 108, while operating the imaging device 102, may notice image artifacts in the generated images 104 and invoke the system 106. The system 106 collects the images 104 for further analysis. The images 104 may be a portion of images or few images taken from a collection of images acquired by the imaging device 102. In an embodiment, the user 108 may select the images to be sent to the system 106. Alternatively, the system 106 may request the imaging device 102 to send the images. In some embodiments, the system 106 is implemented as software on the imaging device 102. In some embodiments, the system 106 is implemented on an edge device connected to the imaging device 102 or a cloud in communication with the imaging device 102. In some embodiments, different portions of the system 106 are implemented on different devices, which can be any appropriate combination of the imaging device, edge device, and cloud.

The system 106 includes a processor 110 having an inference engine 112, and a memory 114. The inference engine 112 examines the image artifact(s) in the images 104 to determine the type(s) of image artifact(s). The image artifacts in an MR application may include, for example, aliasing, annefact, crosstalk, truncation artifact, motion artifact, server crash, shading, partial image, and so on. Similarly, there can be different types of artifacts that may occur in other imaging applications. The inference engine 112 may gather system data 116 from the imaging device 102 to further examine root cause of the image artifacts. The system data 116 may include a system file 118 and a log file 120 associated with the imaging device 102. Moreover, the system data 116 may include data associated with various applications running at the imaging device 102, and subsystems of the imaging device 102.

The inference engine 112 further examines the system data 116 to identify any system/log files that might indicate what has contributed to image artifact. A particular system or log file which is of interest, i.e. may indicate what has contributed to image artifact, may be identified to determine the root cause of the image artifact. The image artifact may be due to user error, subsystem error, application (i.e. software) error, etc. In some embodiments, the inference engine 112 may provide the cause of the image artifact to the user 108 as an output. The output may be presented as a hardware or software fault 122 in an embodiment.

The inference engine 112 may provide an action 124 to address the fault after identifying the cause of the image artifact. In some embodiments, the action 124 may be selected based on the type of image artifact. The action 124 may be running an application for resolving the image artifact. In some embodiments, the action 124 may be running an application (e.g. a tool) to perform scanning or diagnostics of the imaging device 102. In some embodiments, the action 124 may be a recommendation for resolving the image artifact, procedure of resolving the error, a suggestion of type of image artifact, recommendation to connect to a technical expert (i.e. a field engineer) and so on. The user 108 can take the necessary steps based on the action provided by the inference engine 112 to address the image artifact. In some situations, the user 108 can take action to resolve the image artifact.

Figure 2:
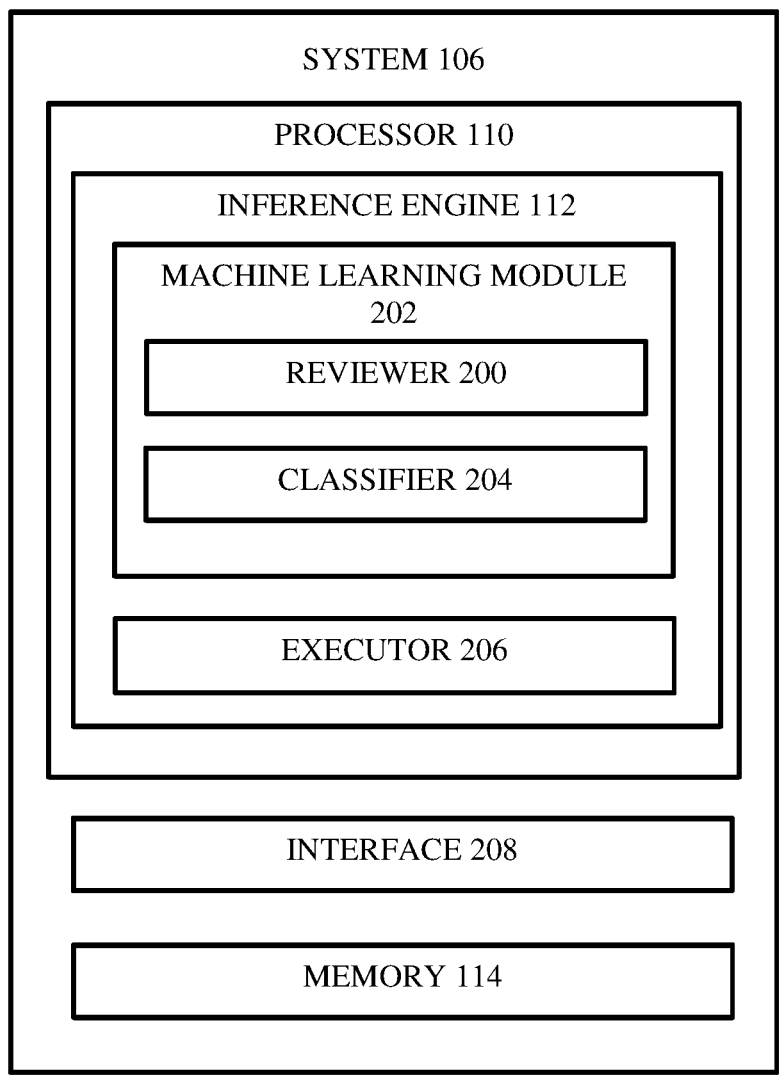
FIG. 2 is a block diagram of the system for analyzing system malfunction in the medical imaging system according to an exemplary embodiment.

Referring to FIG. 2, a block diagram of the system 106 for analyzing malfunction of the medical image device 102 is shown according to an exemplary embodiment. The system 106 includes the processor 110, memory 114, and interface 208. The processor includes the inference engine 112 that examines image artifact(s) in images 104 and the system data 116 to identify the cause of the image artifact(s) as described in conjunction with FIG. 1. A user (e.g. the user 108) may provide information regarding image artifact that occurred in the generated image and time of occurrence of the image artifact. For instance, there may be multiple images acquired by the imaging device and a few images taken at a particular time interval include image artifacts. The user input may include the time interval associated with occurrence of the image artifact. Further, the user may also provide his/her interpretation of the image artifact as input. The interpretation by the user may be description, type, and/or suspected cause of image artifact and so forth, based on user's prior experience. These information from the user may be processed by the inference engine 112. In some embodiments, based on the information, the inference engine 112 may select only images from a collection of images that were captured during the time interval of occurrence of the image artifact. Further, it may be envisioned that the user may provide other information associated image artifacts to the system 106 according to various other embodiments.

The inference engine 112 includes a classifier 204 that classifies the images based on a type of image artifact and a reviewer 200 that reviews and analyzes the system data 116 associated with the medical imaging device (e.g. the imaging device 102). In some embodiments, the reviewer 200 may provide information associated with the analysis to the classifier 204. The analysis information of the images helps the classifier 204 classify the images. In some embodiments, the reviewer 200 parses the system data 116 using for example, a natural language processing technique. Here the system data 116 includes system files and log files that has image scan parameters such as but not limited to, patient or subject, type of anatomy being imaged, imaging protocol, field of view, image reconstruction methodology, image settings, and so on. The image scan parameters help the inference engine 112 understand the images to be analyzed.

In some embodiments, the classifier 204 classifies the image by adding a tag indicating the type of image artifact present in the image. The images analyzed may include different types of image artifacts and accordingly the classifier 204 may classify and tag the images. Tagging the image is one of the method of classifying the image, however other approaches may be used for classifying the images. The classifier 204 may be part of the machine learning module 202. In some embodiment, the classifier 204 may be implemented as a machine learning model and therefore may be capable of automatically classifying the image(s) based learnings from the image training datasets. The training datasets may include multiple image datasets (i.e. medical image datasets) having different kinds of image artifacts. In some embodiments, the training datasets may be stored in knowledge base. The machine learning model learns to map the training datasets to the types of artifacts or no artifact and thereafter become capable of determining if any input image has image artifact(s) and what is the type(s) of image artifact(s) if any. Thus, the machine learning model may be capable of determining the types of image artifacts.

In some embodiments, the machine learning model may be a deep neural network. In some embodiments, the deep neural network may be a convolution neural network having a U-net based architecture that has been trained to receive, as input, a plurality of images having image artifacts. In other embodiments, the deep neural network may be a neural network having but not limited to, a holistically-nested neural network (HNN) architecture, or a full convolution neural network architecture (i.e. 3-dimensional), or a volumetric convolutional neural network architecture.

Once the image(s) are classified, the root cause of the image artifact may be identified. For this, the reviewer 200 reviews the system data 116 to analyze one or more system parameters. More specifically, the reviewer 200 may review system and log files associated with one or more subsystems that might have contributed to the type of image artifact. These system and log files are part of the system data 116 and they reveal more information about the system parameters associated with the subsystems. For example, system parameters associated with a MR coil, may be temperature, radio frequency, pulse sequence (includes echo time, pulse time and time parameter of radiofrequency pulse), load, humidity and so on. If there is any deviation of a system parameter from its required level, there can be errors or faults in the functioning of the corresponding subsystem. Some of these errors or faults in the subsystem might have led to image artifacts. These are only few examples of system parameters of MRI device however it may be envisioned that system parameters can include other system related configurations associated with subsystems of a medical imaging device within the scope of this disclosure. Further, the faults or errors may be a software related fault or hardware related fault or a combination thereof. The reviewer 200 may review the images and confirm the presence of image artifacts based on the analysis of the image scan parameters.

While analyzing the system data 116, the reviewer 200 also determines one or more subsystems of the imaging device that might have contributed to the image artifact. The subsystems in a magnetic resonance (MR) imaging device may include, but are limited to, a patient support system (e.g., patient table), radio frequency (RF) coil(s), amplifiers, gradient coil(s), MR magnet, receiver, and so on. If the subsystems that might have contributed to the image artifacts are identified, then a thorough root cause analysis of the cause of the image artifact can be performed by the inference engine 112. In some embodiments, the reviewer 200 may be part of a machine learning module 202 or may be implemented as a machine learning model which is trained by a plurality of training datasets.

After identifying the faults, an executor 206 may provide an action for addressing the image artifact based on the analysis of the system parameters performed by the reviewer 200. The action may include for example, but is not limited to, providing a recommendation to the user (e.g. the user 108) for minimizing or removing the image artifact, running an application that can perform scanning or diagnostics of various subsystems of the medical imaging device, running a tool or application to resolve the image artifact by rectifying any associated faults or errors in the subsystems of the medical imaging device, and suggestion to contact an expert (e.g. a field engineer) and so on. The recommendation to the user may describe steps to be taken by the user for resolving the error or faults associated with the subsystems. In some embodiments, the recommendation may direct the user to run a calibration tool for calibrating the subsystems to remove the fault or error. There can be multiple other recommendations that can be given by the executor 206 according to various embodiments, even though only few examples are described in detail here.

The action including the recommendation can be presented to the user through a user interface which is part of an interface 208. The user interface also enables the user to provide any user input. One of the example can be, user providing information regarding image artifact that occurred in the generated image and time of occurrence of the image artifact as discussed above with respect to FIG. 2. The interface 208 may also include other software and hardware interfaces for establishing communication with various subsystems of the medical imaging device. The memory 114 may store any information such as, information provided by the user, information generated while processing the system data, new recommendation(s) learned by the machine learning module 202, and the image training datasets, the system data (i.e. system and log files of the imaging device) as the knowledge base, and so on.

Figure 3:
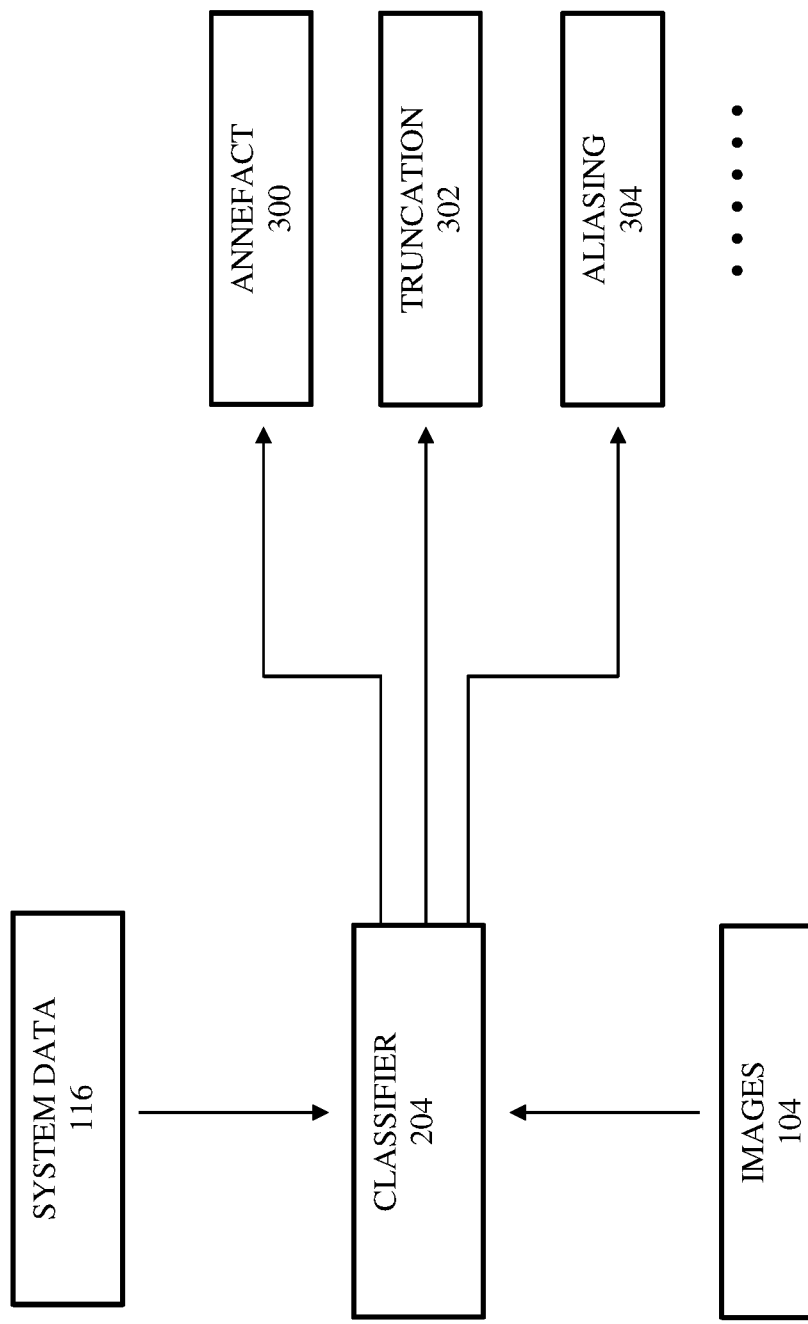
FIG. 3 is a block diagram of a classifier for classifying image artifacts in accordance with an exemplary embodiment.

Now referring to FIG. 3, the system data 116 is analyzed by the classifier 204 for classifying the image artifacts based on the type according to an exemplary embodiment. Analysis of the image scan parameters received from the reviewer 200 helps in classifying the image artifact. The image scan parameters specify the image scan settings and protocols set by the user for generating the images. The classifier 204 analyzes the images 104 and classifies as different types of image artifacts such as, annefact 300, truncation 302, aliasing 304, and so on. Types of image artifacts may include but is not limited to aliasing, annefact, crosstalk, truncation artifact, motion artifact, server crash, shading, server crash, and partial image, and so on.

Explaining by way of an example, if the image parameters from the system data (e.g., system data 116) being analyzed identify that the imaging protocol is set as "fat suppression on", the classifier 204 reviews the image of the patient anatomy to determine if the fat is partially suppressed or not. If the fat is partially suppressed in the image, then classifier 204 classifies the image with "fat partially suppressed" as the image artifact. Whereas, if the fat is not partially suppressed, the classifier 204 may determine if there are other image scan parameters such as, "no phase wrap" or ARC for a particular imaging protocol by analyzing the system data and the image. Accordingly, if "no phase wrap" or ARC is present, the classifier 204 may classify the image artifact as, aliasing, annefact, crosstalk or shading. In case "no phase wrap" or ARC is not present, the classifier 204 reviews the system data 116 (e.g., log files) to determine if there are any other issues. If the issue found is for instance, server crash, then image artifact is classified as "server crash." In another instance, if the issue is identified as partial image, then the image artifact may be classified as "partial image."

Figure 4:
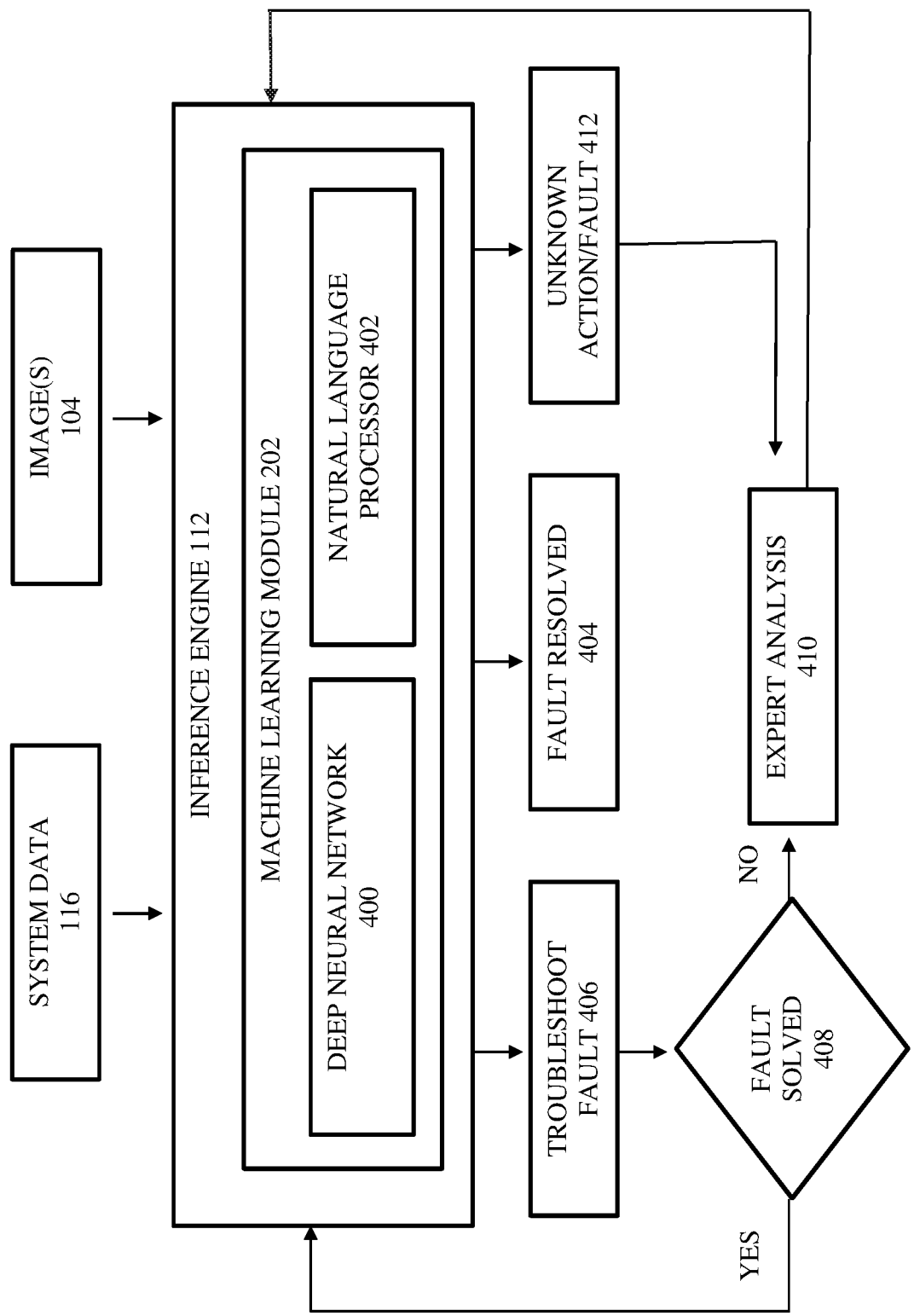
FIG. 4 is a block diagram of an inference engine processing system data and images according to an exemplary embodiment.

FIG. 4 schematically illustrates a block diagram of the inference engine 112 processing the system data 116 and the images 104 according to an exemplary embodiment. The inference engine 112 acts as an expert system in analyzing the image artifacts and the root cause for the image artifact. The inference engine 112 includes the machine learning module 202 which performs this analysis. The machine learning module 202 includes a deep neural network 400 that analyzes and classifies the images 104 for image artifacts. As explained earlier in conjunction with FIGS. 1 and 2, the classifier 204 is implemented as a deep neural network or part of the deep neural network 400 that reviews the images 104 and analyzes the system data 116 to classify the image artifacts. The system data 116 is analyzed by a natural language processor 402 to determine the image scan parameters and the one or more system parameters. The natural language processor 402 may be part of the reviewer 200. In an embodiment the natural language processor 402 may be a text parser that can parse through the system and log files in the system data 116.

If the fault associated with the image artifact is identified, the executor 206 may provide the action for resolving the fault. In some embodiments, the action may include a recommendation to the user explaining the steps to be followed for solving the fault. Once the fault is resolved, the executor 206 identifies or notifies the user that the fault is resolved at 404. This may be presented through a user interface communicably connected to the medical imaging device. In some embodiments, the user interface can be part of a separate device (for example, a remote device) capable of displaying this information to the user.

The inference engine 112 may also trouble shoot the fault at 406. The fault may be trouble shot using some tools or applications. The tools or applications may include for example, a calibration tool, a system performance test tool and so on. In an embodiment, the executor 206 may trouble shoot the fault at 406. Then the inference engine 112 checks if the fault is resolved at 408. If the fault is not resolved, the inference engine 112 directs the user for an expert analysis at 410. In some embodiments, the executor 206 provides an action to the user to connect with an expert (e.g. field engineer) for resolving the fault. This may be given as a suggestion or a recommendation to the user. In some embodiments, the executor 206 may provide the action directly to the user. This action may be again suggesting the user to connect with an expert for resolving the fault.

In another scenario, the fault identified by the inference engine 112 may not be a known fault, i.e., an unknown fault/action at 412. More specifically, the machine learning module 202 may have not been trained on such a fault (e.g. a type of image artifact, a type of hardware or a software error, and so on). Then the system data 116 that includes the system and log files associated with the fault may be sent for expert analysis at 410. In some embodiments, the inference engine 112 may provide an action to the user to contact the expert for analyzing the system data 116. The expert may analyze the system data 116 and arrive at a solution for resolving the fault. This solution may be provided as an input to the inference engine 112 by the user or the expert. In some embodiments, the solution may be fed back to the inference engine 112 through a feedback loop. The machine learning module 202 can be trained on the solution and would be able to provide the action for similar faults in the imaging device or similar image artifact going forward.

Thus, the inference engine 112 or the machine learning module 202 may be trained on new faults or image artifacts that occur in the imaging device and appropriate action that needs to be taken for resolving these faults and image artifacts.

Figure 5:
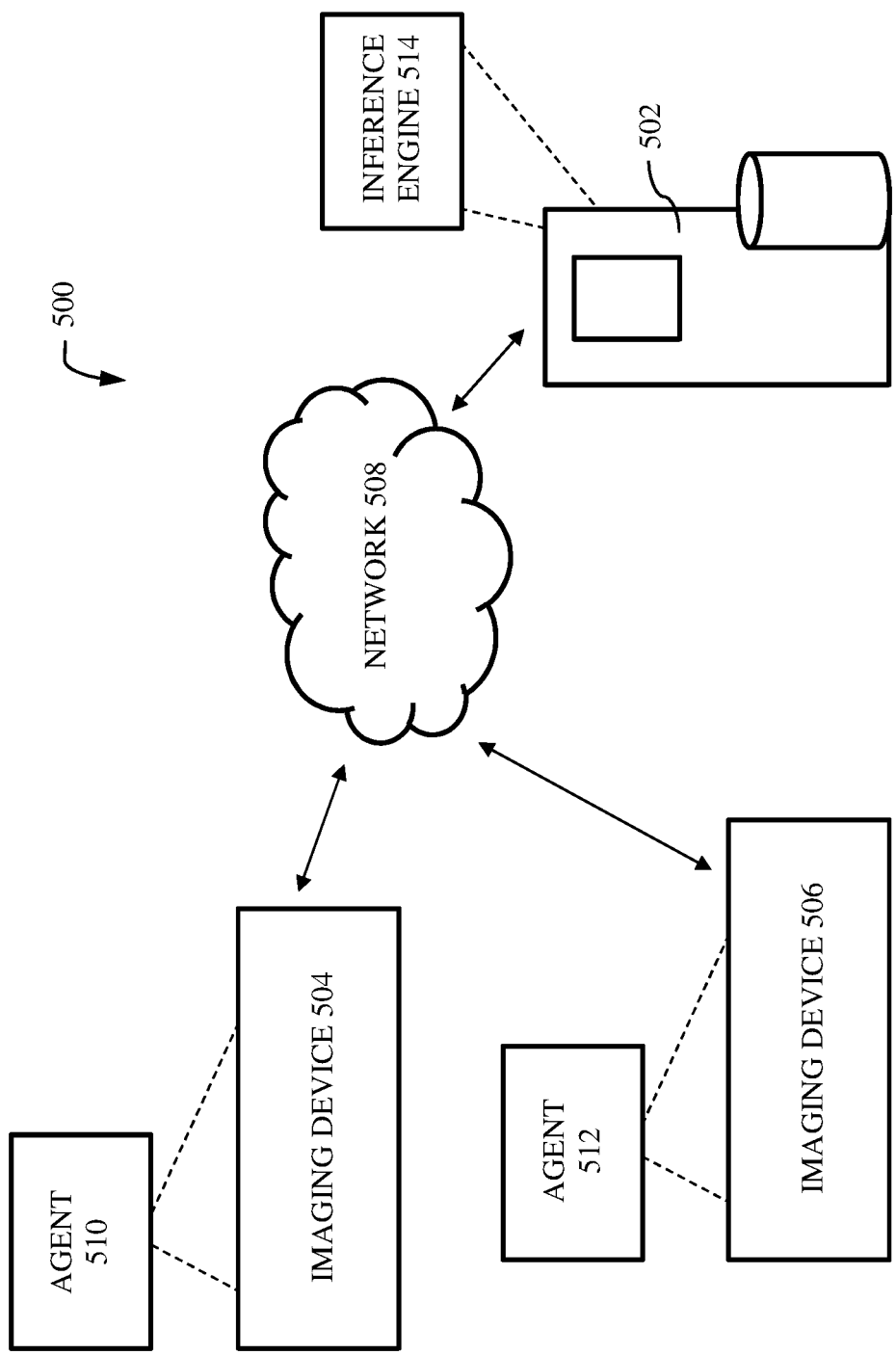
FIG. 5 is a schematic diagram of an instantiation of a system that operates in an environment including a server communicating with multiple imaging devices in accordance with an exemplary embodiment.

An instantiation of the system 106 may operate in an environment 500 including a server 502 communicating with multiple imaging devices as shown in FIG. 5 according to an exemplary embodiment. As shown in FIG. 5, the server 502 communicates with a first imaging device 504 and a second imaging device 506 over a network 508 to manage image artifacts of the medical images generated from these devices. The network 508 may be for example, a wide area network (WAN), internet, a cloud network, a wireless local area network (WLAN), a local area network (LAN) and so on. The first and second imaging devices 504 and 506 may have an agent 510 and an agent 512 respectively. The agents 510 and 512 may be applications running in respective imaging devices for monitoring and collecting system data (e.g. the system data 116). In some embodiments, an agent (such as the agent 510 and the agent 512) may monitor the imaging device to identify if the images generated have any image artifact. The images having the artifacts are sent to the server 502 to be analyzed by an inference engine 514. In some embodiments, based on the request received from the server 502, the agent sends the images to the server 502. In this situation, the server 502 may receive an input associated with a time occurrence of the image artifact. Accordingly, the agent may send images that were generated during the time of occurrence of the image artifacts to the server 502. In this case, the agent may not specifically identify images having image artifacts. Alternatively, the agent may review the images during the time of occurrence of the image artifacts and only relevant images having image artifacts may be send to the server 502. In some embodiments, the imaging device (e.g. the imaging device 504 and the imaging device 506) may send the images to the server 502 upon receiving instructions from the agent (e.g. the agent 510 and the agent 512).

The images may be analyzed by the inference engine 514. The inference engine 514 may be the same as or similar to the inference engine 112. The inference engine 514 may send a request to the agent (e.g. the agent 510 and the agent 512) to collect the system data from the imaging device (e.g. the imaging device 504 and the imaging device 506). In response the agent collects the system data and sends to the inference engine 514. The agent may periodically or constantly collect system data from the imaging device. Then upon receiving the request from the inference engine 514, the agent may send the required system data. In some embodiments, the imaging devices send the system data upon receiving instructions from the respective agents. In some embodiments, the inference engine 514 receives only the system data associated with the subsystems that might have contributed to the image artifacts from the agent. The inference engine 514 can analyze the system data along with the images to identify the cause of the image artifact. The inference engine can provide the action for addressing the artifact. The action may be running an application (e.g. a tool) to perform scanning or diagnostics on the imaging device (e.g. the imaging device 504 and the imaging device 506). In some embodiments, the action may be a recommendation for resolving the image artifact, procedure of resolving the fault in the imaging device, a suggestion of type of image artifact, recommendation to connect to a technical expert (i.e. a field engineer) and so on. The action may be communicated to the agent in the imaging device. In case if the action is to run an application, the agent may run the application in the imaging device. Further, if the action of providing any recommendation/suggestion or procedure for resolving the fault, the agent may communicate them to the user of the imaging device.

In some embodiments, the agent may include diagnostic tools that can perform diagnostics in the imaging device and other tools that can resolve the image artifacts, based on the instructions received from the inference engine 514 in the server 502. In some embodiments, the diagnostic tools or other tools may run on the imaging device remotely from the server 502 by the inference engine 514, and here the agent (e.g. the agent 510 and 512) only facilitates the communication between the imaging device and the inference engine 514.

The environment 500 is shown to include two imaging devices such as the imaging device 506 and the imaging device 508, however it may be noted that more imaging devices may be connected to the server 502. The environment 500 may be a hospital environment wherein the server 502 may be located in the hospital environment to communicate with multiple imaging devices in the hospital. In another embodiment, the server 502 may be a centralized server capable of communicating with multiple imaging devices present in different locations.

Figure 6:
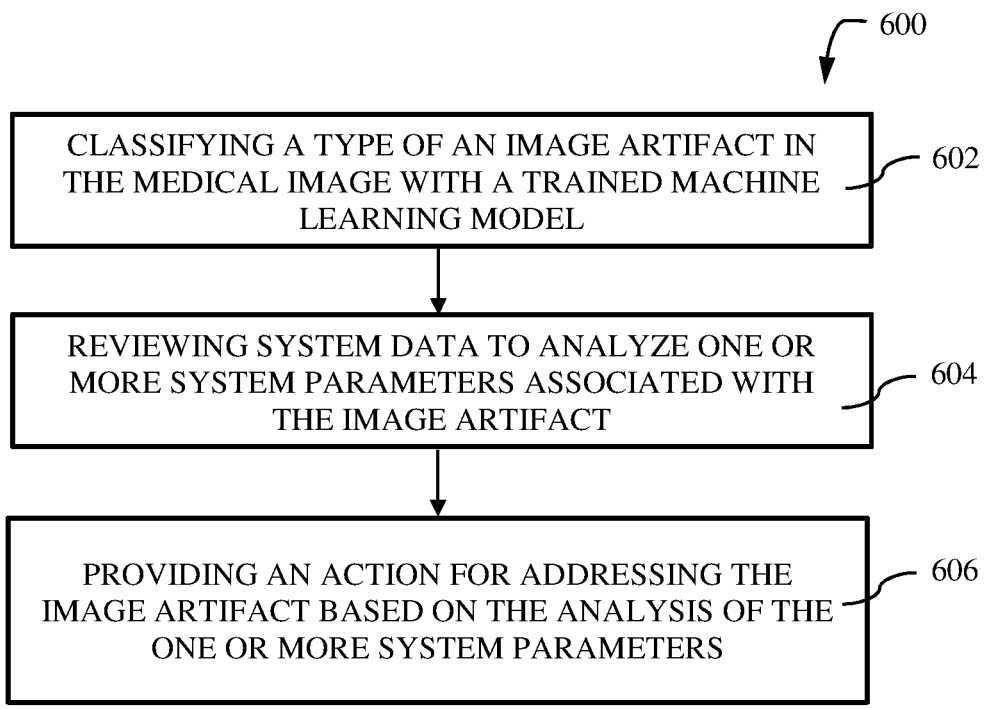
FIG. 6 illustrates a flow diagram of a method for analyzing malfunction of a medical image in accordance with an exemplary embodiment.

Moving now to FIG. 6, a flow chart of a method 600 for analyzing malfunction of a medical imaging device is shown in accordance with an exemplary embodiment. The method 600 includes classifying a type of image artifact in the medical image with a trained machine learning model at block 602. The image artifact in an MR application may be for example, aliasing, annefact, crosstalk, truncation artifact, motion artifact, server crash, shading, partial image and so on. The machine learning model may be trained with a plurality of training datasets. The training datasets may include multiple image datasets (i.e. medical image) datasets having different kinds of image artifacts. The machine learning model is trained to map the images with artifacts to the type(s) of the artifacts.

At block 604, system data is reviewed to analyze one or more system parameters associated with the image artifact. The system data includes system and log files of the imaging devices. The system data is reviewed to analyze the system parameters associated with the type of image artifact. The system parameters are of the subsystems that might have contributed to the image artifact. These system parameters would provide more information of the cause of the image artifact. For example, system parameters of a coil subsystem such as, radio frequency range, temperature and so on, if a parameter deviates from a normal range, image artifacts can occur.

Once the system parameters that might have contributed to the image artifact are identified, an action may be provided for managing the image artifact at block 606. The action may be running an application (e.g. a tool) to perform scanning or diagnostics on the imaging device. In some embodiments, the action may be a recommendation for resolving the image artifact, procedure of resolving the fault in the imaging device, a suggestion of type of image artifact, recommendation to connect to a technical expert (i.e. a field engineer) and so on. Based on the type of image artifact, appropriate action is selected and provided to the imaging device.

Figure 7:
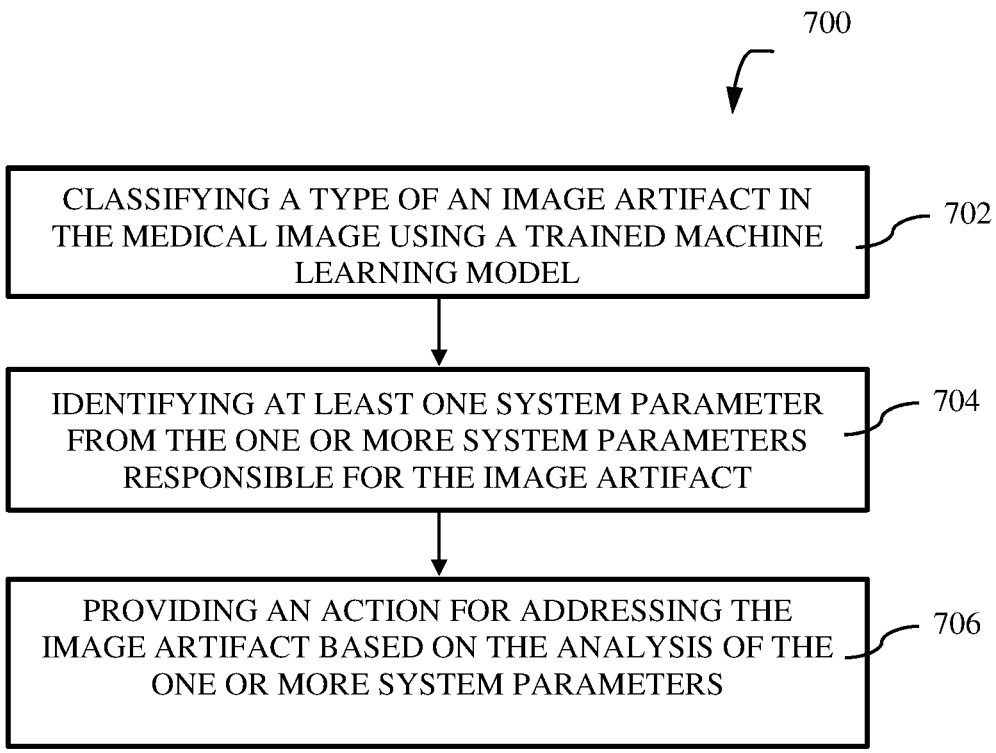
FIG. 7 illustrates a flow diagram of a method for analyzing malfunction of a medical image in accordance with another exemplary embodiment.

FIG. 7 illustrates a flow chart of a method 700 for analyzing malfunction of a medical imaging device in accordance with another exemplary embodiment. The method 700 includes classifying a type of image artifact in the medical image using a trained machine learning model at block 702. Then system data is reviewed to analyze one or more system parameters associated with the image artifact. The system data includes system and log files of the imaging devices. At block 704, at least one system parameter of the one or more system parameters which might have contributed to the image artifact is identified. In some embodiments, the system data reviewed includes system and log files associated with subsystems of the imaging device that might have contributed to the image artifact. The at least one system parameter of the subsystems that contributed to the image artifact is analyzed. Once the system parameters that contributed to the image artifact is found, an action may be provided selectively for managing the image artifact at block 706.

Figure 8:
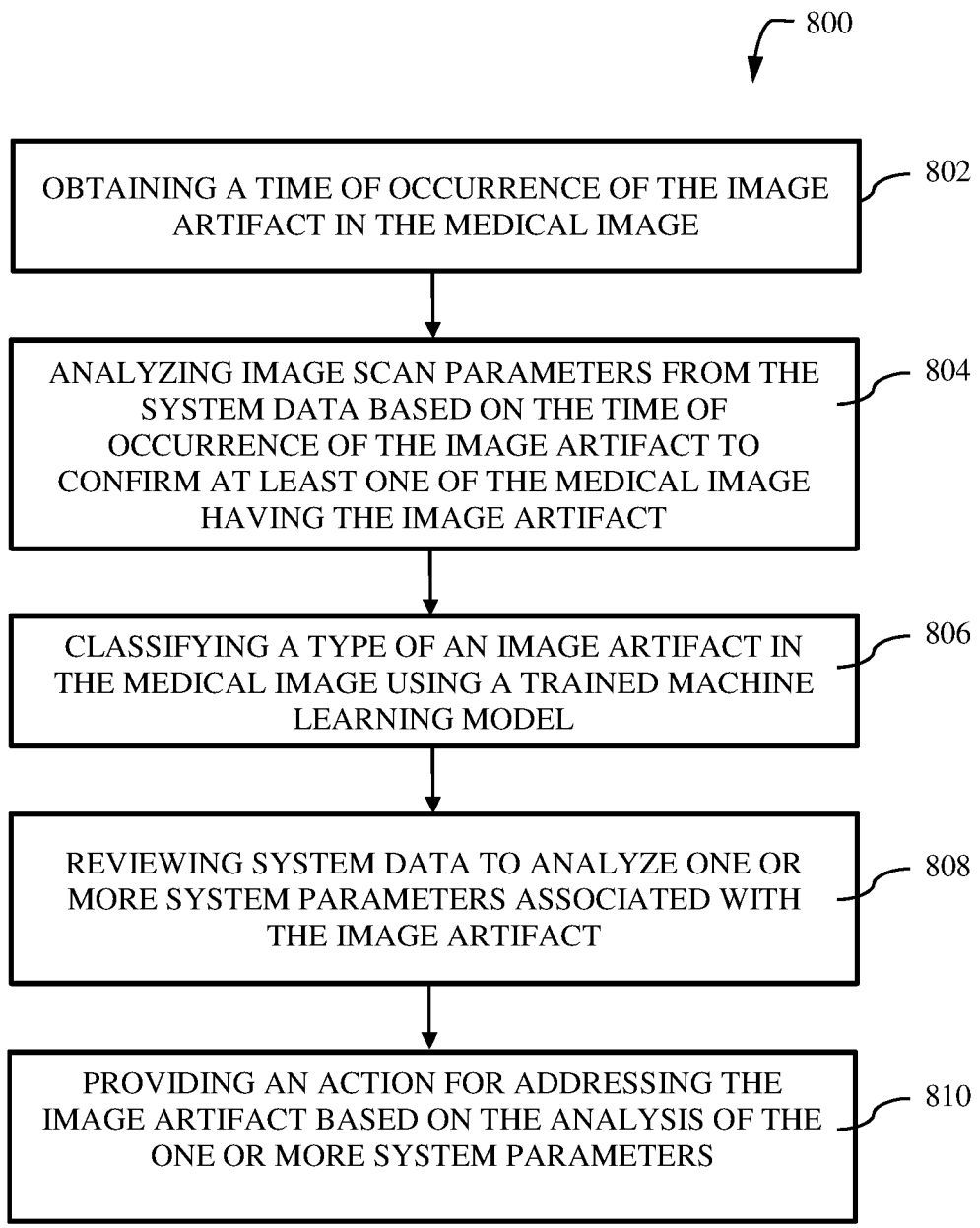
FIG. 8 illustrates a flow diagram of a method for analyzing malfunction of a medical image in accordance with yet another exemplary embodiment.

FIG. 8 illustrates a method 800 of managing image artifact in a medical image in accordance with yet another embodiment. At block 802, a time of occurrence of the image artifact in a medical image is obtained. The time of occurrence of the image artifact may be received as an input from the user of the imaging device. In an embodiment, an inference engine (such as the inference engine 112, and the inference engine 514) may identify the time of occurrence of the image artifact from the images and the system data (e.g. the system data 116). The system data includes system and log files of the imaging devices. The time of occurrence helps in identifying subsystems of the imaging device that might have contributed to the image artifacts. Then only system data (i.e. system and log files) associated with the subsystems are analyzed to determine the cause of the image artifact or the fault in the subsystems. Thus, it avoids the need to examine whole system data of the imaging device thereby enabling a focused analysis to identify the root cause of image artifact.

At block 804, image scan parameters may be analyzed from the system data based on the time of occurrence of the image artifact. This time of occurrence helps identify the images that may have image artifacts accurately and confirm the presence of artifacts. The image scan parameters may include, for example, patient or subject, a type of anatomy being imaged, an imaging protocol, an imaging location, an image reconstruction methodology, image settings and so on. The image scan parameters may provide more information to identify the type of image artifact that can occur.

At block 806, a type of image artifact in the medical image is classified using a trained machine learning model. Different types of image artifacts in an MR application may be for example, aliasing, annefact, crosstalk, truncation artifact, motion artifact, server crash, shading, partial image and so on. There can be other types of image artifact in another application such as, computed tomography, ultrasound, positron emission tomography and so on which is within the scope of this disclosure. The training machine learning model (part of the classifying module 204) may be trained with multiple image training datasets that includes a plurality of image signatures having image artifacts of various types. At block 808, the system data is reviewed to analyze one or more system parameters associated with the image artifact. The system data is reviewed to analyze the system parameters associated with the image artifact. Here the system data includes system and log files associated with the subsystems of the imaging device that contributed to the image artifact. For example, system parameters of a coil subsystem such as, radio frequency range, temperature and so on, if deviates from their normal range, image artifacts can occur. Once the system parameters that have contributed to the image artifact are identified, an action may be provided for addressing the image artifact at block 810.

Figure 9:
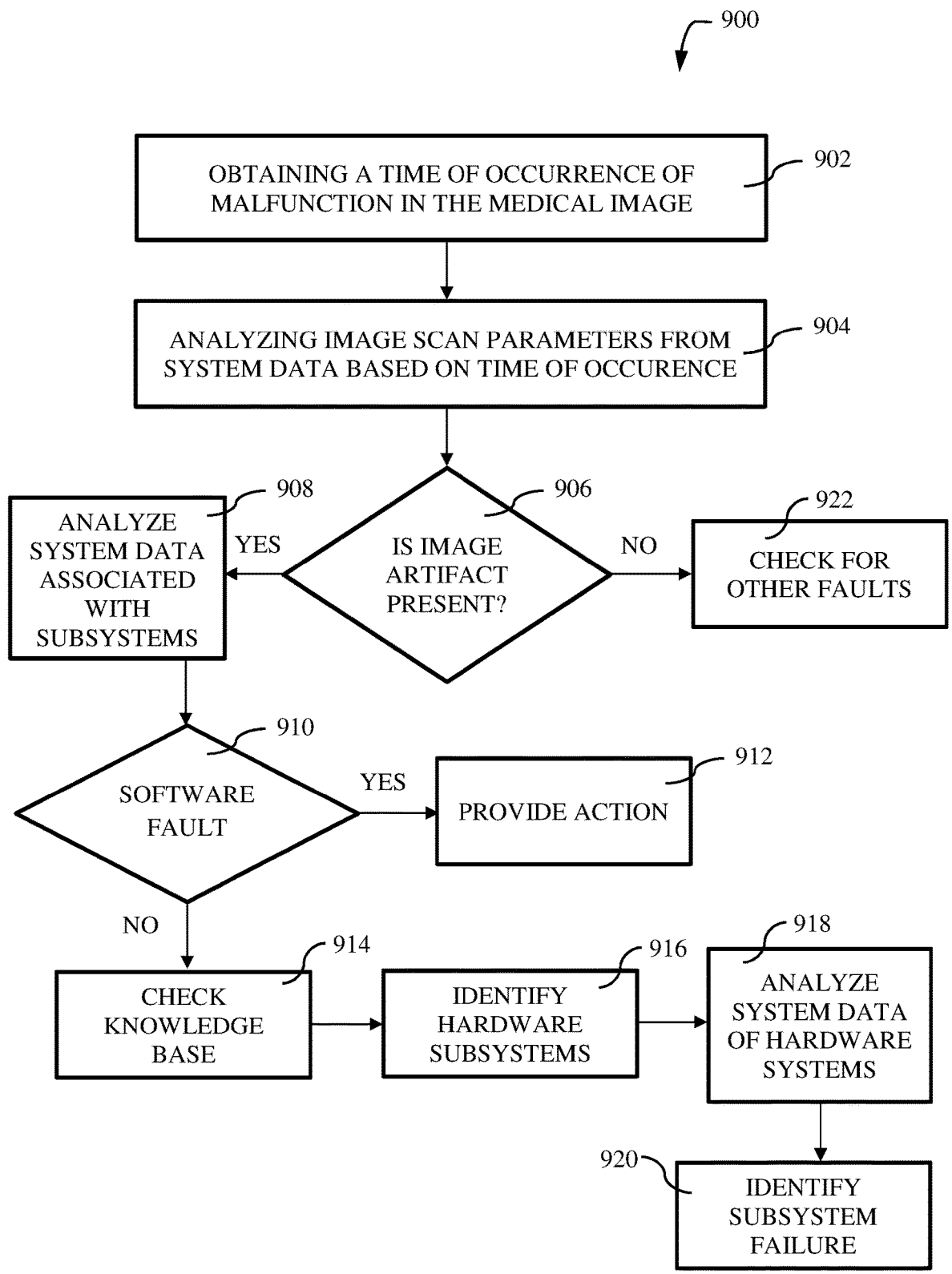
FIG. 9 illustrates a flow diagram of a method for analyzing malfunction of a medical imaging system in accordance with still another exemplary embodiment.

Now moving on to FIG. 9, a flow chart of a method 900 for analyzing malfunction of a medical imaging device is shown in accordance with still another exemplary embodiment. The method 900 includes obtaining a time of occurrence of the malfunction in a medical image at block 902. At block 904, image scan parameters may be analyzed from the system data associated with the imaging device based on the time of occurrence of the malfunction.

Then a check is performed to confirm if there is image artifact in the images at block 906. Only the images generated during the time of occurrence of the image are selected from a collection of images generated by the imaging device. Alternatively, the collection of images may be analyzed to determine and confirm the presence of image artifacts. If there are no image artifacts, then method moves to block 922 to check for any other faults that led to the malfunction. If the image artifact is present, the method moves to block 908 where the system data associated with the subsystems that might have contributed to the image artifacts are analyzed. More specifically, system and log files of the subsystems are analyzed to identify one or more system parameters that might have led to the image artifacts. Then a check if performed to determine if the image artifact is due to software fault at block 910. If yes, then the method moves to block 912 to provide the action for resolving the software fault. The action may be for example, but is not limited to, automatically running an application for resolving the software fault, running an application (e.g. a tool) to perform scanning or diagnostics or debugging of the software fault, a recommendation for resolving the software fault, procedure of resolving the software fault, a recommendation to connect to a technical expert (i.e. a field engineer) and so on.

If it is determined, that the image artifact is not due to a software fault at block 910, then the method checks the knowledge base to analyze the hardware faults that might have contributed to the image artifacts at block 914. The knowledge base may include the information provided by the user while reporting the presence of any image artifacts, information generated while processing the system data, new recommendation(s) learned by the machine learning model (i.e. the machine learning module 202), the image training datasets, and the system data (i.e. system and log files of the imaging device) as explained in conjunction with FIG. 2. Then the hardware systems (e.g. the subsystems of the imaging device) that might have contributed to the image artifacts are identified at block 916. The system data associated with the identified hardware systems are analyzed to determine the fault at block 918. Analysis of the system and log files of these hardware systems can show faults associated with them. Based on this analysis, the subsystems having fault or failure that might have led to the image artifact can be identified at block 920.

Various embodiments of the systems and methods for managing image artifact in a medical image. The method described here accurately identifies the root cause of the fault associated with the image device which resulted in generation of image artifacts. Further, the inference engine in system may have the capability of resolving any faults that led to the image artifact without user interaction. Thus, the downtime of the image device can be reduced by auto-detection of image artifacts or any device faults. In situations when the image device cannot detect the image artifacts, the method provides recommendations/suggestions to resolve the image artifacts to the user of the imaging device. This may reduce the need for contacting an expert (e.g. field engineer or online engineer) for resolving the error in situations where the user can themselves resolve the error with some guidance.

The above-described advantages should be regarded as illustrative rather than restrictive. It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

It may be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "controller circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "controller circuit".

The computer, subsystem, controller circuit, circuit executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, subsystem, controller circuit, and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general-computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for addressing malfunction of a medical imaging device, the method comprising:
    classifying a type of an image artifact in a medical image acquired by the medical imaging device by using a trained machine learning model;
    analyzing system data associated with acquisition of the medical image to identify one or more system parameters that might have contributed to the type of image artifact;
    determining whether the malfunction is caused by a software fault or a hardware fault based on the identified one or more system parameters; and
    providing an action for addressing the image artifact based on the identified one or more system parameters.

2. The method of claim 1, wherein analyzing the system data comprises parsing system files and log files of the medical imaging device.

3. The method of claim 1, wherein the identified one or more system parameters are associated with a subsystem of the medical imaging device that might have contributed to the type of image artifact.

4. The method of claim 1, further comprises obtaining a time of occurrence of the image artifact in the medical image.

5. The method of claim 4, wherein analyzing system data comprises analyzing image scan parameters based on the time of occurrence of the image artifact.

6. The method of claim 1, wherein analyzing system data comprises identifying the one or more system parameters that exceed respective threshold values.

7. The method of claim 1, wherein the action comprises at least one of providing a recommendation to a user and running an application for analysis.

8. The method of claim 1 further comprises training the machine learning model with training datasets.

9. The method of claim 1, wherein the machine learning model comprises a deep neural network.

10. The method of claim 1, wherein providing the action comprises:
    in response to determining that the malfunction is caused by the software fault, running an application for analysis; and
    in response to determining that the malfunction is caused by the hardware fault, providing a recommendation of obtaining further assistance.

11. A system for addressing malfunction of a medical imaging device, the system comprising:
    a memory storing a trained machine learning model; and
    a processor coupled to the memory, the processor configured to:
    classify a type of an image artifact in a medical image acquired by the medical imaging device by using the trained machine learning model;
    analyze system data associated with acquisition of the medical image to identify one or more system parameters that might have contributed to the type of image artifact;
    determine whether the malfunction is caused by a software fault or a hardware fault based on the identified one or more system parameters; and
    provide an action for addressing the image artifact based on the identified one or more system parameters.

12. The system of claim 11, wherein the processor is configured to analyze the system data by parsing system files and log files of the medical imaging device.

13. The system of claim 11, wherein the identified one or more system parameters are associated with a subsystem of the medical imaging device that might have contributed to the type of image artifact.

14. The system of claim 11, wherein the processor is further configured to obtain a time of occurrence of the image artifact in the medical image.

15. The system of claim 14, wherein the processor is configured to review the system data by analyzing image scan parameters from the system data based on the time of occurrence of the image artifact.

16. The system of claim 11, wherein the processor is configured to analyze system data by identifying the one or more system parameters that exceed respective threshold values.

17. The system of claim 11, wherein the action comprises at least one of providing a recommendation to a user and running an application for analysis.

18. The system of claim 11, wherein the processor is further configured to train the machine learning model with training datasets.

19. The system of claim 11, wherein the machine learning model comprises a deep neural network.

20. The system of claim 11 wherein providing the action comprises:
    in response to determining that the malfunction is caused by the software fault, run an application for analysis; and
    in response to determining that the malfunction is caused by the hardware fault, provide a recommendation of obtaining further assistance.

* * * * *